United States Patent [19]

Lange et al.

[11] Patent Number: 5,049,749
[45] Date of Patent: Sep. 17, 1991

[54] X-RAY DIAGNOSTICS INSTALLATION HAVING A STORAGE LUMINESCENT SCREEN

[75] Inventors: Gottfried Lange; Hans-Erich Reinfelder, both of Erlangen, Fed. Rep. of Germany

[73] Assignee: Siemens Aktiengesellschaft, Munich, Fed. Rep. of Germany

[21] Appl. No.: 493,105

[22] Filed: Mar. 8, 1990

[30] Foreign Application Priority Data

Mar. 14, 1989 [EP] European Pat. Off. ........ 89104478.6

[51] Int. Cl.[5] .................... G03B 42/02; G01T 1/105
[52] U.S. Cl. ............................... 250/327.2; 250/484.1
[58] Field of Search ... 250/327.2, 484.1, 327.2 A–327.2 L, 250/484.1 B; 378/165

[56] References Cited

U.S. PATENT DOCUMENTS

| 4,507,797 | 3/1985 | Kato | 378/165 |
|---|---|---|---|
| 4,587,036 | 5/1986 | Degenhardt | 252/301.4 |
| 4,620,098 | 10/1986 | Fujiwara | 250/327.2 |
| 4,641,242 | 2/1987 | Kimura | 250/327.2 X |
| 4,710,626 | 12/1987 | Takahashi et al. | 250/327.2 |
| 4,813,061 | 3/1989 | Kakegawa | 378/99 |
| 4,816,676 | 3/1989 | Aagano | 250/327.2 |
| 4,816,677 | 3/1989 | Adachi et al. | 250/327.2 |
| 4,816,680 | 3/1989 | Nakajima et al. | 250/327.2 |
| 4,816,690 | 3/1989 | Adachi et al. | 250/327.2 |
| 4,845,762 | 7/1989 | Higashi et al. | 382/6 |
| 5,006,709 | 4/1991 | Schiteenhelm | 250/327.2 |

FOREIGN PATENT DOCUMENTS

| 0135723A1 | 4/1985 | European Pat. Off. . | |
| 0157209 | 10/1985 | European Pat. Off. . | |
| 0182095A1 | 5/1986 | European Pat. Off. . | |
| 0182099A1 | 5/1986 | European Pat. Off. . | |
| 0094843B1 | 3/1987 | European Pat. Off. . | |
| 0287129A1 | 10/1988 | European Pat. Off. . | |
| 0295523 | 12/1988 | European Pat. Off. | 250/327.2 |
| 3725826 | 2/1988 | Fed. Rep. of Germany . | |

OTHER PUBLICATIONS

Brochure of Holotec Ltd., 8/84.

Primary Examiner—Constantine Hannaher
Assistant Examiner—Edward J. Glick
Attorney, Agent, or Firm—Hill, Van Santen, Steadman & Simpson

[57] ABSTRACT

The present invention is directed to an improvement for an x-ray diagnostics installation having a storage luminescent screen for the latent storage of x-ray images. The installation includes an x-ray generator, an x-ray exposure device which is connected to the generator for projecting x-ray beams to create an x-ray image on the screen, a read-out device which projects light as a scanning beam on the screen to excite luminesce pixel-by-pixel, a detector arrangement for acquiring the light emitted by the storage screen to create a signal used by the image reproduction system to display the image. The x-ray generator is connected to the read-out arrangement so that parameters of the read-out arrangement are set on the basis of adjustments of the x-ray generator and/or the measurements carried out during the exposure.

15 Claims, 1 Drawing Sheet

X-RAY DIAGNOSTICS INSTALLATION HAVING A STORAGE LUMINESCENT SCREEN

BACKGROUND OF THE INVENTION

The present invention is directed to an x-ray diagnostics installation having a storage luminescent screen for the latent storage of the respective x-ray image. The installation comprises an x-ray generator having an x-ray exposure means connected to the generator for projecting an x-ray beam through a patient to create an x-ray image, a read-out means wherein the storage luminescent screen is caused to luminesce pixel-by-pixel by a surface-shaped scanning with a scan beam of a radiation source, a detecting means for acquiring the light emitted by the storage luminescent screen and an image reproduction system for creating an image from the light received by the detector means.

X-ray diagnostics installations of this type are disclosed in U.S. Pat. No. 4,710,626, whose disclosure is incorporated herein by reference thereto and which claims priority from the same Japanese Application as European Published Application A-0 094 843. In this type of x-ray diagnostics installation, the storage luminescent screen is radiated with x-rays in a registration station so that hole electrons, that are stored in a potential trap, are produced therein. Subsequently, the exposed storage luminescent screen is conveyed into a read-out station in which the read-out means scans the entire surface of this storage luminescent screen pixel-by-pixel with an additional radiation source, for example, a laser, so that the electrons stored in the traps are excited and can fall back into recombination centers whereby an energy difference is beamed out in the form of light quanta having a wavelength that is different in comparison to the wavelength of the radiation source. This image is then supplied in a known fashion to an image reproduction system that effects an image reproduction either on a monitor or as a hard copy.

For surface-wise scanning of the storage luminescent screen, the laser beam is deflected, for example, in a horizontal direction by a mirror and is displaced in a vertical direction, so that all the picture elements lying on the storage luminescent screen are successively scanned. The light emitted by the storage luminescent screen is then acquired by an opto-collector and is imaged on a light-sensitive entry face of the detector. An output signal of the detector is supplied, for example, to a normal video chain for reproduction of the x-ray image on a monitor. U.S. Pat. No. 4,587,036, whose disclosure is incorporated herein by reference thereto and which claims priority from German Application 33 47 207, discloses europium-activated barium fluorobromium chloride compounds which can be excited with visible light (photo-stimulation) and can thereby be employed as stimulatable phosphors. Normally employed He-Ne lasers that produce focussed beams having a wavelength of 633nm can be employed for exciting this stimulatable phosphor.

Such x-ray diagnostics installations, however, have a disadvantage. For example, due to the accommodation of the storage films in light-tight cassettes, which is due to the removal of the foil in the read-out machine with all mechanical manipulations and due to the preliminary read-out of the film for acquiring dynamics, extremely long time spans will occur until the presence of the x-ray image on a video monitor or, respectively, on the hard copy master will be obtained.

SUMMARY OF THE INVENTION

The object of the present invention is to create an x-ray diagnostics installation of the above-mentioned type that is compactly constructed and with which a fast registration of the radiation image that is optimally adapted to the respective conditions can be obtained.

This object is inventively achieved in that the x-ray generator is connected to the read-out means so that the parameters of the read-out means are set on the basis of the adjustment of the x-ray generator and/or measurements. What is thereby achieved is that the parameters that influence the resolution, brightness and quenching, can be derived from the data, given specific settings of the x-ray generator, as well as measurements of the brightness of the x-ray image carried out by the x-ray diagnostics installation.

A simple structure of the x-ray diagnostics installation is obtained when the x-ray generator comprises a control means with organ keys, and this control means is connected to the read-out means. On the basis of the selected organ key, the resolution and brightness of the read-out means can be varied, depending upon the registered organ. Thus, for example, a bone exposure can be more finely scanned than a thorax exposure. In addition, the strength of the read-out can be set on the basis of the different brightness.

The variation of the resolution can be achieved when the control means is connected to the deflection means and to the conveyor unit for controlling the resolution. The speed of the deflection means and the feed rate of the conveyor unit can, thereby, be varied so that the feed rate and scan rate in a line direction can be selected large in coarse scanning so that a relatively large regions per pixel are scanned, given prescribed clocks for the acquisition of the data. When, by contrast, a fine and exact scanning should occur, then both speeds must be selected small with reference to the scan frequency.

Undesired brightness differences in the x-ray image can be compensated when the control means is connected to the detector for controlling the read-out voltage or to the radiation source for controlling the brightness of the scan beam. The residual charge that still remains stored can also be optimally quenched, even given different size thereof, when the control means is connected to the quench means. As a result thereof, the brightness of the quench means can be set so that it is guaranteed that the residual information contained in the storage luminescent screen is quenched in all instances, but only with the energy required for that purpose. A fast and simple deflection means is obtained when it is a holographic deflection means for the scan beam.

An especially simple and compact structure is obtained when the read-out means is arranged in a housing in which a carrying device for the storage luminescent screen is attached and with which device the storage luminescent screen can be moved from a first position for the registration and to a second position for quenching, and when the scan means and detector are arranged between the two positions under the carrier so that the scanning occurs upon displacement of the storage luminescent screen from its first position into its second position. Since registration positions and quenching positions can lie directly next to one another and the scan means is arranged between the two positions, this will create a compact structure. Since the scan means is attached under the conveyor means, it will influence neither the registration nor the quenching process.

Other advantages and features of the invention will be readily apparent from the following description of the preferred embodiments, the drawings and claims.

DESCRIPTION OF THE PREFERRED EMBODIMENTS

Figure 1:
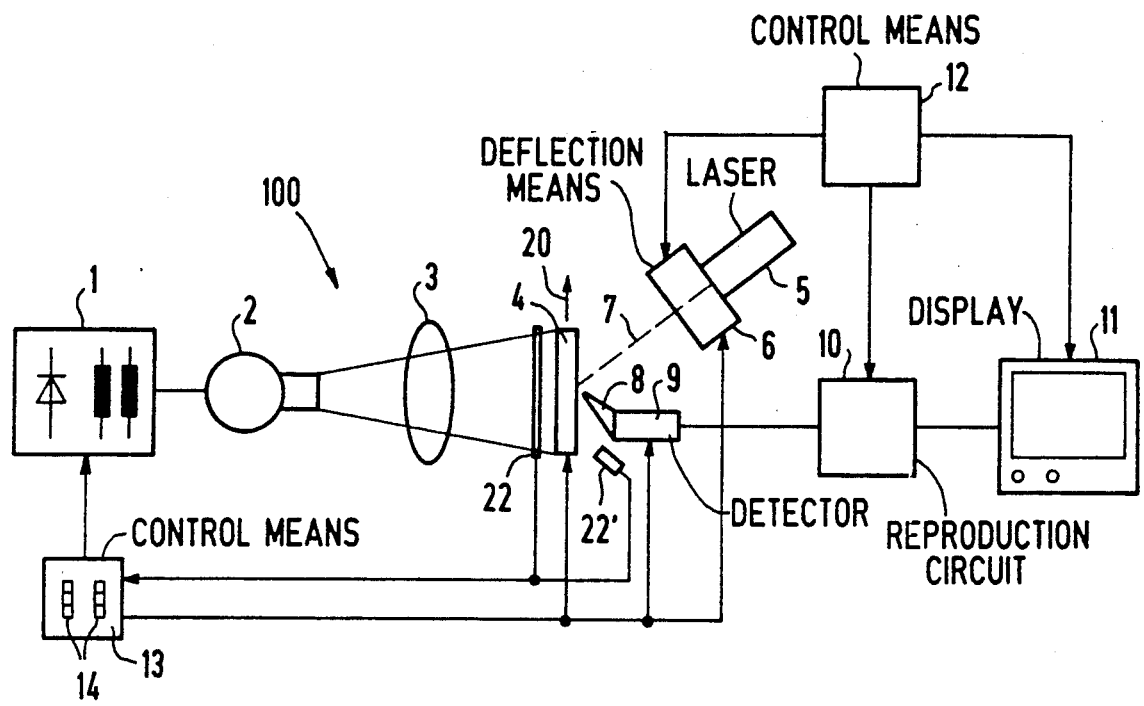
FIG. 1 is a schematic diagram of an x-ray diagnostics installation in accordance with the present invention.
Figure 2:
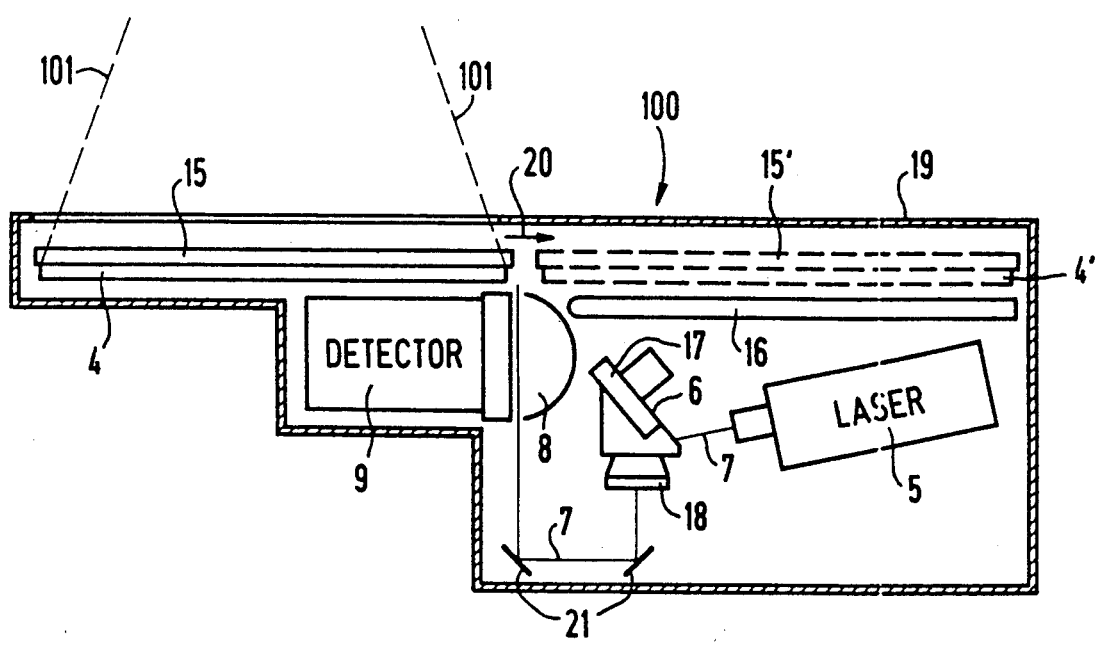
FIG. 2 is a cross sectional view of the x-ray diagnostics installation of the present invention.

The principles of the present invention are particularly useful when incorporated in an x-ray diagnostics installation, which is generally illustrated at 100 in FIGS. 1 and 2. The installation 100 includes a high-voltage generator 1 that feeds an x-ray tube 2 that will emit x-rays that will penetrate a patient 3. The x-rays attenuated by the patient in conformity with his transparency are incident onto a luminescent storage screen 4 to form an incident radiation image. As already set forth, the image produces hole electrons in the storage luminescent screen 4 that are stored in traps of the stimulatable phosphor so that the latent image is stored in the storage luminescent screen 4 after the irradiation.

For reproducing the latent, stored image, the storage luminescent screen 4 is usually excited by a radiation source, for example by a laser 5. The laser 5 is followed by a deflection means 6 that deflects the scan beam across the storage luminescent screen 4 line-by-line. The deflection means 6 for the scan beam 7, for example, can be composed of an electro-optical beam deflector for the horizontal direction. The vertical deflection can occur in that the storage luminescent screen 4 is displaced in the direction of the arrow 20 so that the entire surface of the storage luminescent screen can be successfully scanned by the scan beam 7 pixel-by-pixel.

A light conductor 8 acquires the light emitted by the luminescent screen 4 and conducts it onto a detector 9 that acquires the brightness of the scan pixel and converts this brightness into an electrical signal that is supplied to a reproduction circuit 10 that generates a video signal for the individual, analog output signals of the detector 9 for portrayal on a monitor or display 11. During the reproduction, control means 12 effect the synchronization of the deflection means 6, of the reproduction circuit 10 and of the monitor 11. The reproduction circuit 10 can comprise image stores, a processing circuit and converters, as is known.

A control means 13 that, for example, can be provided with organ keys 14, is provided for setting the exposure value of the high-voltage generator 1. This control means 13 allows exposure values of the high-voltage generator to be set that are allocated in a known fashion to the individual organ keys 14.

FIG. 2 shows an exposure station of the type wherein the storage luminescent screen 4 is secured to a conveyor means 15 arranged in a housing 19. In the illustrated position, the conveyor means 15, together with the storage luminescent screen 4, is situated in a first position, which is an exposure position. In the exposure position, the storage luminescent screen 4 is irradiated by the x-rays 101. After the irradiation has been carried out, the conveyor means 15 displaces the storage luminescent screen 4 in the direction of arrow 20 toward a second position. The storage luminescent screen 4 is thereby simultaneously scanned by the read-out means, which include the elements 5-9 arranged under the conveyor means 15. The scan beam 7 generated by the laser 5 is supplied to a holographic deflection means 17, which is used as a deflection means 6 that comprises an objective 18 that focusses the scan beam 7 on the storage luminescent screen 4. Holographic deflection means 17 is a known device, and an example is sold by Holotec Ltd. and is described in greater detain in the brochure of Holotec Ltd. of Rochester, N.Y., which bears identification marks 8/84. In order for an adequate deflection of the scan beam 7 to be able to occur over the entire width of the storage luminescent screen 4, even given small dimensions, the scan beam 7 is multiply deflected by mirrors 21 so that the folded beam path will occur. The scan beam 7 is thereby directed between a light conductor 8 and a detector 9, which are described in greater detail in copending U.S. patent application Ser. No. 418,256, filed Oct. 6, 1989, which claims priority from European Application 88 117 155.7. However, a standard light conductor composed of silica glass, plexiglass or the like can also be used.

When the scan process is ended, then the conveyor means 15 has shifted the storage luminescent screen 4 to such an extent that it is situated in a second position, in which it is shown with broken lines 4' and 15'. The quenching by quenching means 16, which is shown as being positioned under the luminescent screen while the screen is in the position 4', and under the conveyor means, now occurs in this second position.

This entire read-out means is accommodated in a housing 19 that, for example, can be secured to a portable frame. It is, therefore, possible to push this exposure unit under the patient's bed, as needed, on which bed the patient 3, who is to be examined, is situated so that the desired exposure can be produced. This exposure station, however, can also be rigidly coupled to the patient supporting table.

The exposure station, however, can also have a measuring instrument 22 or 22' (see FIG. 1) allocated to it, wherein the measuring instrument 22 will directly measure the x-rays, while the unit 22' will measure the light emitted by the spontaneous emission during the irradiation of the storage luminescent screen 4. The exposure can be disconnected on the basis of this measuring instrument 2 by controlling the high-voltage generator I. Simultaneously, the measuring instrument 22 will supply values to the control means 13, which, as already set forth with reference to the explanation of the organ keys, sets the read-out voltage of the detector 9 and the brightness and scan rate of the beam 7, as well as the speed of the conveyor means 15 for the storage luminescent screen.

The storage luminescent screen 4, however, can also be attached to the conveyor means that, in this case, is merely composed of a frame that leaves the entire exposure area free, both in the upward direction toward the x-ray tube and in a downward direction toward the scan means 5-9.

A simple and optimum read-out of the x-ray image stored in the storage luminescent screen with a compact structure is obtain with this inventive execution of the x-ray diagnostics installation.

Although various minor modifications may be suggested by those versed in the art, it should be understood that we wish to embody within the scope of the patent granted hereon all such modifications as reasonably and properly come within the scope of our contribution to the art.

We claim:

1. In an x-ray diagnostics installation comprising a storage luminescent screen for the latent storage of a respective x-ray image, said installation including an x-ray generator connected to an x-ray exposure means for producing x-ray images on the screen, read-out means for creating an image from the storage luminescent screen by causing a luminesce pixel-by-pixel on the basis of an area-wide scanning with a scanning beam of a radiation source, detector means for acquiring the light emitted by the storage luminescent screen, and an image reproduction system for receiving an output of said detector means, the improvements comprising the x-ray generator being connected to the read-out means so that parameters of the read-out means are set on the basis of settings of the x-ray generator and on measurements carried out during the exposure.

2. In an x-ray diagnostics installation according to claim 1, wherein the x-ray generator includes control means having organ keys that are connected to the read-out means.

3. In an x-ray diagnostics installation according to claim 2, which includes a conveyor unit and deflection means for deflecting the scanning beam, and wherein the control means is connected to the deflection means and to the conveyor unit for controlling the resolution.

4. In an x-ray diagnostics installation according to claim 3, wherein the control means is connected to the detector means for controlling the read-out voltage.

5. In an x-ray diagnostics installation according to claim 4, wherein the control means is connected to the radiation source for controlling the brightness of the scanning beam.

6. In an x-ray diagnostics installation according to claim 5, which includes means for quenching the screen and wherein the control means is connected to the means for quenching.

7. In an x-ray diagnostics installation according to claim 6, wherein the deflection means for the scanning beam is a holographic deflection means.

8. In an x-ray diagnostics installation according to claim 7, which includes a housing, said conveyor unit including carrier means being mounted for movement in said housing for transporting the storage luminescent screen in a single plane in the housing between a first position for the exposure and a second position for quenching, said read-out means and detector means being arranged in the housing under the carrier means in a position between the two positions so that a scanning occurs while displacing the storage luminescent screen from its first position into its second position.

9. In an x-ray diagnostics installation according to claim 1, which includes deflection means for guiding the scanning beam, a conveyor unit, and control means being connected to the deflection means and to the conveyor unit for controlling the resolution.

10. In an x-ray diagnostics installation according to claim 1, which includes control means being connected to the detector means for controlling the read-out voltage.

11. In an x-ray diagnostics installation according to claim 1, which includes control means being connected to the radiation source for controlling the brightness of the scanning beam.

12. In an x-ray diagnostics installation according to claim 1, which includes quench means for removing the image from the screen and control means being connected to the quench means for controlling the quench means.

13. In an x-ray diagnostics installation according to claim 1, which includes a housing, said housing receiving a carrier means for transporting the storage luminescent screen in a single plane between a first position for exposure from the x-ray exposure means to a second position above means for quenching the screen, said read-out means being disposed in said housing in a position between the two positions for the carrier means so that scanning will occur while the carrier means transfers the storage luminescent screen between the first position and the second position.

14. In an x-ray diagnostics installation according to claim 13, wherein said read-out means is disposed in said housing below said single plane.

15. In an x-ray diagnostics installation according to claim 1, which includes holographic deflection means for guiding the scanning beam.

* * * * *